US005667718A

United States Patent [19]
Jones et al.

[11] Patent Number: 5,667,718
[45] Date of Patent: Sep. 16, 1997

[54] LIGHTWEIGHT DUST SUPPRESSING AGGREGATE FOR ANTISKIDDING APPLICATIONS

[75] Inventors: Martin Allen Jones, Boulder; Edward Charles Rosar, Lakewood; Maurice Glenn Pattengill, Golden, all of Colo.

[73] Assignee: Western Aggregates, Inc., Boulder, Colo.

[21] Appl. No.: 668,505

[22] Filed: Jul. 2, 1996

Related U.S. Application Data

[63] Continuation of Ser. No. 519,803, Aug. 28, 1995, abandoned, which is a continuation-in-part of Ser. No. 336,422, Nov. 9, 1994, abandoned.

[51] Int. Cl.⁶ .................. C09K 3/18; B05D 5/00
[52] U.S. Cl. .................. 252/70; 252/71; 106/13; 106/36; 106/DIG. 7; 106/601; 427/136; 427/140; 427/138
[58] Field of Search ............ 106/36, 13, DIG. 7, 106/681; 252/70, 71; 427/136, 140, 138

[56] References Cited

U.S. PATENT DOCUMENTS

| | | | |
|---|---|---|---|
| 3,928,221 | 12/1975 | Slater et al. | 252/70 |
| 4,012,537 | 3/1977 | Dubois | 427/138 |
| 4,296,207 | 10/1981 | Siegmaud | 521/53 |
| 4,692,259 | 9/1987 | Roman | 252/70 |
| 5,114,475 | 5/1992 | Siegmund et al. | 106/13 |
| 5,441,760 | 8/1995 | Pattengill et al. | 427/138 |

OTHER PUBLICATIONS

"Ice Retardant Pavement" Research Project HR290 Nov. 1991, City of Des Moines and Iowa Department of Transportation, by D. Larson, pp. 1–9.

*Primary Examiner*—Douglas J. McGinty
*Assistant Examiner*—Nicholas Ogden
*Attorney, Agent, or Firm*—Edward A. Steen

[57] ABSTRACT

A traction aggregate suitable for antiskidding applications where reduced dust generation is desired. An expanded substrate is saturated with a liquid absorbed dust suppressant and sealed with a liquid water repellant sealant/dust suppressant. The aggregate traction material may be dispersed over thoroughfares to provide adequate traction for vehicles and, once the snow/ice melts and the roadway dries, leaves behind a non-dusting material that will remain a dust suppressant material during and after subsequent vehicular degradation.

2 Claims, No Drawings

LIGHTWEIGHT DUST SUPPRESSING AGGREGATE FOR ANTISKIDDING APPLICATIONS

This application is a continuation of application Ser. No. 08/519,803 filed on Aug. 28, 1995 now abandoned which is a CIP of Ser. No. 08/336,422 filed on Nov. 9, 1994 now abandoned.

TECHNICAL FIELD

The instant invention relates to roadway maintenance in general, and more particularly, to a traction aggregate having low dusting properties.

BACKGROUND ART

In order to maintain adequate traction for thoroughfares, such as roadways, runways, highways, ramps, walkways, etc., agencies frequently spread a gritty material upon the surfaces.

Typically, sand, gravel, cinders, stone, chips, etc., are spread on thoroughfares at varying rates to provide traction on slippery pavements.

A major drawback with many traction enhancers occurs when vehicles travel continuously over the treated roadway; the traction control agents are ground finer and finer leading to increased airborne particulate pollution.

In particular, several areas of Colorado are in violation of the National and State Ambient Air Quality Standard for particles less than or equal to 10 µm in diameter ("$PM_{10}$"). One source of $PM_{10}$ emissions is the resuspension of antiskid material applied to active roads. Previous studies have established a direct relationship between the loading of materials on paved surfaces and the $PM_{10}$ emissions generated by vehicular traffic. Furthermore, emissions from street sanding have been shown to contribute up to forty-five percent of many of the maximum winter concentrations in Denver.

It is clear from studies cited in "Guidance Document of Selecting Antiskid Materials Applied to Ice-and-Snow-Covered Roadways" (U.S. Environmental Protection Agency—1991) that techniques for controlling $PM_{10}$ emissions resulting from antiskid materials should be aimed at minimizing small particle size loadings on the traveled portions of the roadway. Specifically, reduced silt loadings may be expected to result from snow/ice control programs that encompass improvements in three areas: (1) the properties of antiskid materials applied, (2) the application protocols and procedures, and (3) the procedures for removal of the antiskid material from roadways.

The goal for controlling $PM_{10}$ concentration is in the reduction of fine particulate emissions. Emission reductions may result from: (1) the use of antiskid materials that have been tested for durability and silt content, (2) lower application rates and application of the material on fewer roads, and (3) removal of material through wet or dry broom sweeping, vacuuming, or water flushing.

SUMMARY OF THE INVENTION

Accordingly, there is provided a dust suppressing/antiskid material that reduces $PM_{10}$ emission rates after application by reducing fine particle loadings ejected into the atmosphere after vehicular attrition.

In one embodiment, lightweight, porous aggregate formed from expanded shale is impregnated with absorbed, liquid dust suppressing mixtures that result in lowered airborne emissions when subjected to attrition by the wheels of passing vehicles. The resultant treated material is a lightweight traction aggregate that exhibits low potential for the generation of airborne dust emissions. Pumice, scoria and similar materials are suitable substitutes for expanded shale.

Due to the porosity of the aggregate, certain liquid mixtures of dust suppressants may be fully absorbed by the aggregate substrate. Other mixtures of liquid dust suppressants can be used to coat and seal the external aggregate surface, and internal surfaces, to retard the leaching of other absorbed liquid dust suppressors. The useful properties of the liquid materials remain available over the life of the application since the additives remain active in and on internal and external surfaces of each particle for an extended period of time.

PREFERRED MODE FOR CARRYING OUT THE INVENTION

Assignee manufactures Realite® lightweight expanded shale aggregate. The expanded shale aggregate is lightweight and durable. Since it is porous, it can absorb over 30% of its weight in liquids.

As originally envisioned, the aggregate was impregnated with a chloride based dust suppressant solution. The resultant compound exhibited satisfactory antiskidding properties. However, it became apparent that as the chloride solution was leached out of the aggregate, its removal allowed the generation of dust—a condition that the product was originally designed to specifically avoid.

It was then discovered by impregnating the aggregate particles with a liquid dust suppressant medium, preferably magnesium or calcium chloride solution, and then sealing the chloride solution into the aggregate with a sealant/dust suppressant composed of emulsified vegetable oils and/or emulsified petroleum resin globules which are contained within the chloride solution, the resultant novel composition exhibited significantly lower attrited dust generation values when compared to standard antiskid materials such as sand.

The aim of the composition is for it to be saturated with an absorbed dust suppressant and coated externally and internally with a sealant/dust suppressant liquid mixture. As can be readily appreciated, the quantity of liquid absorbed by different samples of aggregate may be dissimilar depending on the characteristics of the batch. Accordingly, the figures given hereinafter are non-limiting examples. However, they represent medians that one skilled in the art may be guided by.

The composition includes a lightweight particulate aggregate substrate and a number of additives. An emulsion comprised of dust suppressants such as a chloride (calcium chloride or magnesium chloride solution) and an emulsified sealant/dust suppressant (such as vegetable oil) is absorbed into and onto the aggregate. The aggregate is coated and absorbed internally with a water repellant sealer/dust retardant to retard the loss of the absorbed dust suppressant chloride solution. Sealers/dust suppressants include vegetable oils (for example, raw linseed, soybean, corn, cottonseed, coconut), and Coherex™ emulsified petroleum resin (available from COBITCO, Denver, Col.) which were emulsified petroleum resin in a chloride solution.

For $PM_{10}$ reduction, the ability to form a flexible but tenacious waterproof dust retardant sealing film about the aggregate pellet is important. The external and internal film derived from the emulsified vegetable oil or Coherex maintains the integrity of the treated particle and reduces the flushing (leaching) out of the absorbed dust suppressant chloride solution from the particulate by snow melt water. It is important that the film remains flexible at least down to about $-6.7°$ C. (20° F.). Accordingly, vegetable oils (if so used) with low solidification temperatures are preferred such as linseed oil at about $-23°$ C. ($-9.4°$ F.) and soy bean oil at about $-13°$ C. (8.6° F.) which not only provide a sealing film but also act as a dust suppressant when the treated traction aggregate is attrited on the paved surface by vehicular traffic. When attrition occurs the emulsified oil globules and chloride solution cling to the finely attrited particles. These fine particles form agglomerates resulting from the low temperature viscid property of the vegetable oils to allow the fine particles to adhere together. Also the deliquescent property of $CaCl_2$ or $MgCl_2$ keeps the fine particles moist and aids in binding these particles.

The combination of the viscid nature of the linseed oil (or other oils) and the accompanying deliquescent property of the $CaCl_2$, agglomerate the finely degraded particles, thus suppressing their ability to become airborne after the paved surface is dry. In cases where the fine treated particles do not agglomerate to each other, they tend to stick to larger particles or the road surface itself.

As a result of agglomerating the fine particles, the resultant agglomerates are not capable of becoming airborne due to the increased weight and size as compared to the individual attrited fine particle which are capable of being cast airborne by vehicular traffic, wind and like action. Also the fine individual particles, which did not form agglomerates, are adhered to the paved surface and not projected airborne due to the viscid and deliquescent properties on these fine particles by the sealant and dust suppressant additives.

An experimental testing regimen was undertaken to determine the efficacy of the instant invention. A brief overview is now provided.

Test sample no. 25 was a conventional rock salt/sand sample and represented a base application rate of 12,000 lbs/linear mile ($3.37 \times 10^6$ kg/km). The tested samples, consisting of $-4+8$ mesh or 70–30 weight percent mixtures of $-4+8$ mesh plus $-8+16$ mesh expanded shale lightweight aggregate, were oven dried and then soaked in various solutions containing the additives. The application rate of the treated samples was predicted on a volumetric equivalent of the test sample no. 25. Table 1 lists the samples and their characteristics.

After the treated aggregate samples were allowed to drain and air dry, they were subjected to wet reciprocating tire tests followed by a washing step and then dry reciprocating tire tests in a wheel attritor unit during which measurements of the quantity of materials ejected into the environment as total suspended particulate ("TSP") were determined. The total suspended particulate measurements after dry reciprocating wheel testing are listed in Table 1.

TABLE 1

| Ref. No. | Sample No. | TSP (mg/M³) | Grad. (Mesh) | Treatment | Emulsion Agent/Test | Aged | Pre-Washed |
|---|---|---|---|---|---|---|---|
| 1 | 5A | 1.3138 | 4 × 8 | RL/C | SDS | N | N |
| 2 | 5AA | 1.7661 | 4 × 8 | RL/C | SDS | N | N |
| 3 | 3B | 2.4628 | (1) | (1) | (1) | (1) | (1) |
| 4 | 13AA | 2.4779 | 4 × 8 | S/C | SDS | N | N |
| 5 | 13A | 3.2508 | 4 × 8 | S/C | SDS | N | N |
| 6 | 11A | 5.0844 | 4 × 8 | CT/C | SDS | N | N |
| 7 | 5B | 6.0381 | 70/30 | RL/C | SDS | N | N |
| 8 | 2D | 6.2357 | 4 × 8 | 1% S/C | NONE | 24 hr | N |
| 9 | 12A | 6.2941 | 4 × 8 | CN/C | SDS | N | N |
| 10 | 17A | 6.8287 | 4 × 8 | 7:1(2) | CX | 30 min | N |
| 11 | 1A | 7.1373 | 4 × 8 | 7:1 | CX | 9 days | N |
| 12 | 1AA | 7.4194 | 4 × 8 | 7:1 | CX | 6 days | N |
| 13 | 3BB | 8.8057 | 70/30 | 7:1 | CX | 6 days | N |
| 14 | 16A | 10.3021 | 4 × 8 | 7:1(3) | CX | 5 min | N |
| 15 | 5D | 11.1207 | 4 × 8 | 1% CC/C | NONE | 24 hr | N |
| 16 | 11B | 11.8513 | 70/30 | CT/C | SDS | N | N |
| 17 | 7B | 12.5765 | 70/30 | CT/C | SDS | N | N |
| 18 | 13B | 12.5879 | 70/30 | S/C | SDS | N | N |
| 19 | 12B | 13.4381 | 70/30 | CN/C | SDS | N | N |
| 20 | 4D | 13.6663 | 4 × 8 | 14:1 | CX | 24 hr | N |
| 21 | 9B | 13.9135 | 70/30 | S/C | SDS | N | N |
| 22 | 4B | 14.2339 | 70/30 | RL/C | SDS | N | N |
| 23 | 6C | 14.687 | 4 × 8 | 7:1 | CX | N | Y |
| 24 | 15A | 14.6894 | 4 × 8 | CN/C | X-45 | N | N |
| 25 | 2B | 15.0754 | –⅜" | LAKE-WOOD SAND/SALT | N/A | N/A | N/A |
| 26 | 9A | 15.7199 | 4 × 8 | S/PW | SDS | N | N |
| 27 | 3D | 16.1077 | 4 × 8 | RL/PW | NONE | 24 hr | N |
| 28 | 15B | 16.4064 | 70/30 | CN/C | SDS | N | N |
| 29 | 4C | 16.4087 | 4 × 8 | 14:1 | CX | N | Y |

TABLE 1-continued

| Ref. No. | Sample No. | TSP (mg/M³) | Grad. (Mesh) | Treatment | Emulsion Agent/Test | Aged | Pre-Washed |
|---|---|---|---|---|---|---|---|
| 30 | 9C | 17.0132 | 4 × 8 | S/C | NONE | 5 days | Y |
| 31 | 4A | 17.2928 | 4 × 8 | RL/PW | SDS | N | N |
| 32 | 10C | 17.6768 | 4 × 8 | 1% RL | NONE | 5 days | Y |
| 33 | 14B | 18.6788 | 70 × 30 | CN/PW | SDS | N | N |
| 34 | 7A | 20.6980 | 4 × 8 | CT/PW | SDS | N | N |
| 35 | 2C | 22.1292 | 4 × 8 | 1% S | NONE | N | Y |
| 36 | 3C | 22.6662 | 4 × 8 | 1% RL | NONE | N | Y |
| 37 | 11C | 33.6586 | 4 × 8 | 1% CC | NONE | 5 days | Y |
| 38 | BLANK | 0.0945 | Calibration | - Wheel Not | In Motion | N/A | N/A |
| 39 | BLANK | 0.2438 | Calibration | - Wheel In | Motion | N/A | N/A |

NOTES:
S = SOYBEAN; RL = RAW LINSEED; CT = COTTONSEED; CN = CORN; CX = COHEREX - A premixed emulsion additive; CC = COCONUT; /C = $CaCl_2$ Solution; /PW = Plant Water; 7:1 & 14:1 = Ratio of $CaCl_2$: Coherex (vol.); 70/30 = 70 wt. % −4 + 8 Mesh plus 30 wt. % −8 + 16 Mesh; SDS = Sodium Dodecyl Sulfate; X-45 = Triton ®.
X-45 Nonionic Octyphenol Polyether Alcohol
Y = Yes; N = No; N/A = Not Applicable
(1) Data unusable due to air leak in wheel testing device.
(2) This sample was aged for 30 minutes after $CaCl_2$ solution: Coherex treatment, then was sprayed with a saturated NaCl/plant water solution.
(3) This sample was aged for 5 minutes after $CaCl_2$ solution: Coherex treatment, then was sprayed with a saturated NaCl/plant water solution.

Application rates and physical quantities for the various reference numbers are as follows:

Thirty-nine tests were performed. Reference numbers 38 and 39 were calibrative blank tests. Reference number 25 was taken from the main public facility of the city of Lakewood, Col. This sample reportedly contained 10–15% rock salt). The remainder of the tests all utilized assignee's REALITE® lightweight aggregate as a substrate.

Tests that involved vegetable oil emulsification in a $CaCl_2$ solution or plain plant water used suffactants or emulsifying agents such as sodium dodecyl sulfate (SDS—$NaOSO_3C_{12}H_{25}$) or Triton® X45, a nonionic octyphenol polyether alcohol (trademark of Union Carbide). Other vegetable oil emulsion tests were made with a $CaCl_2$ solution or plain plant water, but without using a surfactant or an emulsifying agent. A series of tested emulsions used a mixture of a commercially available emulsified petroleum resin (Coherex) and a $CaCl_2$ solution. Finally, some aggregates were surface treated directly with vegetable oils after being saturated with a $CaCl_2$ solution.

Emulsifiers were used in order to disperse the vegetable oils in the treatment solution of plain plant water or $CaCl_2$ solution. Essentially, any suitable surfactant or emulsifying agent (SDS, X-45, sodium oleate, potassium oleate, etc.) having a relatively high HLB (hydrophile lipophile balance) number of about 8–18 is particularly effective. Mofoam DC®, a proprietary foaming agent (Midwest Industrial Supply, Inc., Canton, Ohio) containing sulfonate in propylene glycol, is also useful.

For vegetable oil emulsions, about 73.4 cm³ of aggregate was soaked in about 50 ml of vegetable oil, mixed and emulsified with about 450 ml of either plant water or about 450 ml solutions of plant water containing about 32.2% (weight percent) $CaCl_2$ and about 0.7 grams of SDS surfactant. The emulsified vegetable oil globules act as a sealant/dust suppressant while the calcium chloride solution acts as an absorbed dust suppressant. The volume ratio of sealant/dust suppressant to absorbed dust suppressant may be about 1:9 to about 200:1.

In the example where the X-45 emulsifying agent was used (ref. no. 24), about 73.4 cm³ of aggregate were soaked in about 50 ml of vegetable oil mixed and emulsified in about 450 ml solution of plant water containing about 32.2% (weight percent) $CaCl_2$ and with about 5 ml of X-45 emulsifying agent.

The quantity of total solution required to treat the aggregate should be sufficient to thoroughly soak the individual particles of the aggregate. Generally speaking, simple visual or tactile tests are all that are necessary to determine whether the aggregate has been sufficiently saturated.

Due to the small size of the pores in the aggregate, the mixtures should preferably be microemulsions in order for the emulsified oil globules to satisfactorily enter and wet the interior of the aggregate. Physical agitation of the solution will aid to maintain the microemulsion. The microemulsion may be prepared by adding the dispersion phase (oil) gradually to the continuous phase (water and surfactant) and then adding a co-surfactant such as an amphophil. The latter component may be an intermediate chain length alcohol (e.g., 1-Hexonal [$C_6 H_{13}$ OH]).

A number of the samples were aged and/or prewashed to evaluate the effectiveness of the seal coating in confining the dust suppressant chloride solution. Some of the samples were used with minimal time ambient air aging (about 72° F. [22.2° C.]) and some after ambient air aging for extended time periods. Similarly, some of the samples that were prewashed were washed without undergoing a wet grind step prior to dry grinding with the wheel attritor unit. The samples were simply washed, allowed to dry and then dry ground under the tire.

In addition, a number of samples were treated by soaking 300 grams of aggregate in a $CaCl_2$ solution (32.2 % by weight $CaCl_2$ in plant water) for five minutes, drained for 1 minute and then adding 3 grams of vegetable oil to the damp material. The soaked substrate/oil ratio is about 100:1. A volume ratio range of about 950:1 to 40:1 is within the instant invention. This mix was stirred until the oil had visually coated the aggregate. The resulting mixture was either drained for five minutes or five days whereupon the wash studies were commenced. The aforementioned draining periods are independent of the aging times.

Exposing the Coherex treated samples to salt (NaCl) appears to accelerate the resin set by breaking the emulsion. One technique is to first soak the aggregate in a $CaCl_2$/

Coherex solution (7:1 CaCl$_2$ [32.2 wt % CaCl$_2$] solution): as received Coherex solution (by volume) and then spraying the soaked aggregate with a saturated salt (NaCl) solution.

The tests suggest the following results:

1. Lightweight aggregate may be treated with the instant dust reduction media tested to produce less TSP during attrition than the conventional Lakewood rock salt/sand mixture. The resultant bulk density is between about 40 to about 60 pounds per cubic foot (641–961 kg/m$^3$).

2. Minus 4 plus 8 mesh aggregate tended to produce lower TSP values during attrition than did material comprised of 70 wt. % –4+8 plus 30 wt. % –8+16 mesh aggregate.

3. Under similar test conditions, aggregate treated with 7:1 CaCl$_2$ solution Coherex mixture tended to produce lower TSP values during attrition than did aggregate treated with 14:1 CaCl$_2$ solution: Coherex mixture. Varying degrees of emulsion setting/petroleum resin separation occurred when Coherex was mixed into the CaCl$_2$ 4. Aggregate treated with emulsions made with CaCl$_2$ solution produced lower TSP generation results than did material treated with emulsions made with plant water.

5. Materials treated with the various vegetable oils by direct application, i.e., not using emulsion techniques, then washed prior to testing showed TSP generation values higher than the Lakewood rock salt/sand sample (ref. nos. 32, 35, 36, 37).

6. Minus 4 plus 8 mesh aggregate treated with soybean oil directly, i.e, no emulsion, but not -pre-washed (ref. no. 8) produced TSP generation values lower than similarly treated material that was pre-washed (ref. no. 35).

7. Material (4+8 mesh) treated with 7:1 CaCl$_2$ solution: Coherex mixture aged 30 minutes followed by a NaCl solution spray showed lower TSP generation values than similarly treated material not sprayed with a NaCl solution, or similarly treated material aged 5 minutes prior to spraying with NaCl solution.

8. The treatment procedures using aggregate (–4+8 mesh and/or 70 wt. % –4+8 mesh plus 30 wt. % –8+16 mesh) treated with Coherex followed by exposure to a sodium solution source such as NaCl appear workable, and produce a product that generates significantly less TSP than a conventional Lakewood rock salt/sand material in a roadway-traffic situation. The Coherex material is purchased as a commercially available premixed emulsion additive.

9. Among the vegetable oils used, data shows that raw linseed and soybean treatments appear as the preferred oils in terms of reducing TSP generation. These types can be purchased in the unrefined state, which are acceptable for this application.

In summary, the instant invention encompasses the use of a lightweight porous/stable substance, treated with a deliquescent/hydrophilic media that acts as a dust suppressant when exposed to atmospheric conditions that is concurrently treated with a water repellant/sealant/dust suppressant that retards the leaching of the absorbed dust suppressant during wet conditions. More particularly, it is preferred to utilize Western Aggregates, Inc. expanded shale as the substrate material, chloride solutions (such as CaCl$_2$ and MgCl$_2$) as the absorbed dust suppressant media, and emulsified vegetable oils or Coherex mixture as the sealant/dust suppressant media.

While in accordance with the provisions of the statute, there are illustrated and described herein specific embodiments of the invention, those skilled in the art will understand that changes may be made in the form of the invention covered by the claims and certain features of the invention may sometimes be used to advantage without a corresponding use of the other features.

The embodiments of the invention in which an exclusive property or privilege is claimed are defined as follows:

1. A traction aggregate composition, the composition adapted to be applied onto a surface consisting essentially of spreadable lightweight substrate particles selected from the group consisting of expanded shale and scoria, the substrate particles substantially impregnated with a liquid dust suppressant selected from the group consisting of calcium chloride and magnesium chloride, the substrate particles enveloped by an emulsified petroleum resin water sealant, and wherein a volume ratio of the liquid dust suppressant to emulsified petroleum resin water sealant is in the range of about 7:1 to about 14:1.

2. The composition according to claim 1 including a bulk density of about 40 to about 60 pounds/ft$^3$.

* * * * *